US012290763B2

(12) United States Patent
Tilz

(10) Patent No.: US 12,290,763 B2
(45) Date of Patent: May 6, 2025

(54) FILTER SYSTEM FOR REMOVING AND/OR NEUTRALIZING UNDISSOLVED OIL, GREASE, AND SALTS AND/OR ABRADED METAL PARTICLES ON AND IN EMULSIONS CONTAINING WATER

(71) Applicant: NEWFLUID GMBH, Mannheim (DE)

(72) Inventor: Wolfgang Tilz, Schwetzingen (DE)

(73) Assignee: NEWFLUID GMBH, Manheim (DE)

( * ) Notice: Subject to any disclaimer, the term of this patent is extended or adjusted under 35 U.S.C. 154(b) by 489 days.

(21) Appl. No.: 17/775,576

(22) PCT Filed: Nov. 11, 2020

(86) PCT No.: PCT/EP2020/081806
§ 371 (c)(1),
(2) Date: May 9, 2022

(87) PCT Pub. No.: WO2021/094403
PCT Pub. Date: May 20, 2021

(65) Prior Publication Data
US 2022/0387907 A1    Dec. 8, 2022

(30) Foreign Application Priority Data

Nov. 13, 2019 (DE) .......................... 102019217503.1

(51) Int. Cl.
| | |
|---|---|
| *B01D 17/00* | (2006.01) |
| *B01D 17/12* | (2006.01) |
| *B01D 24/00* | (2006.01) |
| *B01D 24/10* | (2006.01) |

(Continued)

(52) U.S. Cl.
CPC ............. *B01D 17/08* (2013.01); *B01D 17/12* (2013.01); *B01D 24/007* (2013.01); *B01D 24/105* (2013.01); *B01D 24/4869* (2013.01); *B01D 39/04* (2013.01); *B01D 2201/307* (2013.01)

(58) Field of Classification Search
None
See application file for complete search history.

(56) References Cited

U.S. PATENT DOCUMENTS

| | | | |
|---|---|---|---|
| 4,734,207 A | 3/1988 | Calloni et al. | |
| 5,632,889 A * | 5/1997 | Tharp | ...................... E03F 5/16 |
| | | | 210/170.03 |
| 5,782,983 A | 7/1998 | Inada et al. | |

(Continued)

FOREIGN PATENT DOCUMENTS

| | | |
|---|---|---|
| CN | 109607902 A | 4/2019 |
| DE | 2315869 A1 | 10/1974 |

(Continued)

OTHER PUBLICATIONS

European Patent Office, "International Search Report and Written Opinion," International Application No. PCT/EP2020/081806, Feb. 10, 2021.

*Primary Examiner* — Clare M Perrin
(74) *Attorney, Agent, or Firm* — Dentons Durham Jones Pinegar; Sarah W. Matthews

(57) ABSTRACT

The invention relates to a filter system for removing and/or neutralizing undissolved oils, greases and salts, preferably also floating bodies, such as metal debris, on/in water-containing emulsions from, in particular, containers and tanks that are used for holding and storing emulsions.

24 Claims, 5 Drawing Sheets

(51) Int. Cl.
*B01D 24/48* (2006.01)
*B01D 39/04* (2006.01)

(56) References Cited

U.S. PATENT DOCUMENTS

| | | | | |
|---|---|---|---|---|
| 6,531,059 | B1* | 3/2003 | Morris | B01D 29/58 |
| | | | | 210/170.03 |
| 2016/0101993 | A1* | 4/2016 | Tilz | B01D 17/0205 |
| | | | | 210/776 |

FOREIGN PATENT DOCUMENTS

| | | |
|---|---|---|
| DE | 29505757 U1 | 3/1996 |
| DE | 102007049845 A1 | 4/2009 |
| EP | 0001101 A2 | 3/1979 |
| WO | 2014198867 A2 | 12/2014 |

* cited by examiner

FILTER SYSTEM FOR REMOVING AND/OR NEUTRALIZING UNDISSOLVED OIL, GREASE, AND SALTS AND/OR ABRADED METAL PARTICLES ON AND IN EMULSIONS CONTAINING WATER

CROSS-REFERENCE TO RELATED APPLICATIONS AND PRIORITY CLAIM

This application claims the benefit under 35 U.S.C. § 371 to International Application Number PCT/EP2020/081806 filed on Nov. 11, 2020, which claims the priority of German Patent Application No. 10 2019 217 503.1 filed on Nov. 13, 2019. The entire disclosures of said applications are incorporated by reference herein for all purposes and priority is claimed to said applications by the present application.

The invention relates to a filter system for removing and/or neutralizing undissolved oils, greases and salts, preferably also floating bodies, such as metal debris, on/in water-containing emulsions from, in particular, containers and tanks that are used for holding and storing emulsions.

Filter systems for removing undissolved oils and greases on water-containing emulsions from, in particular, containers and tanks that are used for holding and storing emulsions are known in various embodiments. For emulsion containers and tanks, surface belt skimmers are usually used to remove the floating oil-grease film. In this process, a mechanically/electrically driven continuous belt is dipped into the tank or the container so that the oil/grease adhering to the continuous belt is filtered out of the surface of the emulsion by the upward movement. The oil/grease adheres to the continuous belt. The latter is then deflected by a deflection roller from the upward movement to a downward movement and then freed from the oil/grease film by means of a scraper. The oil/grease is collected via a horizontally dropping groove in a container (for example, a bucket). The continuous belt cleaned in this manner then dips back into the tank or container so that, through the downward-upward movement of the continuous belt and via a second deflection roller, the adhering oil/grease is once again filtered out of the surface of the emulsion.

In practice, various machines are known for machining workpieces, which machines cool and lubricate the workpieces and the tool by means of an emulsion. In a computer-controlled turning/milling machine, for example, various lubricants and sliding agents are used for friction reduction and sliding of the moving tool holders and workpiece holders. They prevent an increased expenditure of force during the movement and thereby prevent a seizure and thus a defect of the machine.

Such lubricants are known in practice. They are referred to as so-called track oils and usually consist of paraffin and naphthenic hydrocarbons with additives. (For example, manufacturer: Scharr, trade name: CGLP ISO-VG (68) and (220) track oil). During operation, these lubricants are continuously dosed between the slide rails of the tool holders and workpiece holders and thereby form a thin film and thus guarantee good sliding. However, due to the movement of the slide rails, the track oil is pressed out at the edges of the slide rails and must thus be dosed in. For the machining of workpieces by means of tools, the emulsion is conveyed from the container or tank by means of a suction-pressure pump for cooling and lubrication and sprayed onto the area to be machined by means of a nozzle. The cooling and lubricating liquid, an emulsion, e.g., of a mixture of mineral oil, emulsifiers, stabilizers and inhibitors (for example, manufacturer: Blaser, trade name: BLASOCUT® BC 25 MD) is mixed with 90 to 98% water and 2 to 10% Blaser mineral oil mixture. When the emulsion flows off of the workpiece and the tool, the track oil is rinsed off of the edges of the slide rails and is collected in the machine tank and or in the container, where it accumulates on the surface of the emulsion as an oil-grease film. Furthermore, a large number of metal chips, which are rinsed with the emulsion and the track oil into the tank or into the container, are produced during machining by the turning, milling or drilling, etc. of the workpiece. Such metal chips are collected and removed manually or automatically from the machine. The tank or container are usually divided into different zones, where separation of the chips and the emulsion takes place. In most cases, perforated screens are used here so that it is ensured that for conveying the emulsion, the pump does not suck in any chips and its delivery rate is thereby impaired. In doing so, it is disadvantageous that the track oil impedes the outflow of the emulsion so that, in the case of a high emulsion recirculation, a level gradient in the tank or in the container arises, which, on the one hand, results in an overflow in front of the screen and, on the other hand, in not enough emulsion flowing to the pump.

WO 2014/198867 A2 discloses a filter system with an emulsifier filter, an injector for gas enrichment, and an adhesion filter, which use in particular spherical filter elements for purification.

When this filter system is put into operation, all three filter containers must be closed in a vacuum-tight manner. The emulsion is then sucked out of the machine tank/container by means of a vacuum pump via the skimmer. When the suction-pressure recirculation pump is put into operation, it must additionally be ventilated since the emulsion does not flow into the pump chamber.

By means of a mechanical level control, the emulsion is sucked into a level chamber, which is then used to switch on, switch off and switch over the pumps. In this case, oils, greases and graphites can lead to switching cycle disruptions.

When the emulsion is sucked out of the emulsifier filter by means of a suction-pressure recirculation pump, disruptive clumping and thus level fluctuations in the level chamber can occur.

In the treatment of emulsions loaded with graphite, etc., adhesions of the filter elements can occur, which then have to be removed from the filter containers from time to time in order to mechanically/chemically clean them. Since such adhesions are located as fill in the filter containers, they have to be individually removed in a time-consuming manner.

The invention is based on the technical problem of providing a filter system that works better than known methods, devices and systems with regard to structure and mode of operation and overcomes the aforementioned problems.

According to the invention, this problem is solved with a filter system having the features of claim 1 and the further independent claims.

The present invention is based on a filter system as described in WO 2014/198867 A2, the content of which is incorporated into the present application and the disclosure of which is referenced in its entirety, in which, however, basic additional features and/or modifications disclosed herein lead to surprising improvements.

The present invention relates in particular to a filter system for removing and/or neutralizing undissolved oils and greases on/in water-containing emulsions from, in particular, containers and tanks that are used for holding and storing emulsions that are used for cooling and lubricating workpieces and tools during machining, with at least
- a device for sucking the emulsion out of the emulsion tank/container, preferably by means of a skimmer,
- a line from the device to an inlet of a first filter container,
- an outlet, preferably arranged laterally, from the first filter container,
- a pump connected to the outlet,
- a second filter container with a ventilation valve,
- a third filter container, which is connected to the second filter container via a line, wherein the filter system has a three-way valve, wherein the inlet of the three-way valve is connected to the pump, the first three-way outlet is connected to the first filter container, and the second three-way outlet is connected to the second filter container.

The device for sucking the emulsion out of the emulsion tank/container is preferably a skimmer.

The first filter container, the second first filter container and/or the third filter container preferably respectively contain a plurality of spherical filter elements.

The first filter container is preferably a container for a first filter unit, the emulsifier filter unit.

The second filter container is preferably a container for a second filter unit, the oxidation filter unit, also called the adhesion filter unit.

The third filter container is preferably a container for a third filter unit, the reaction filter unit, also called a capillary filter unit.

The first filter unit preferably has a level control unit.

The skimmer, the first filter container, the second filter container and the third filter container preferably form a unit and are arranged in series so that the emulsion can particularly preferably be sucked out and then treated, in particular mechanically, chemically and biologically treated, by the filter elements.

In a preferred embodiment, the first filter container, preferably also the second filter container and/or the third filter container, respectively have a plurality of spherical filter elements.

During the sucking-in of the emulsion, for example by means of an air pump, the three-way valve according to the invention connected downstream of the first pump, preferably a recirculation pump, connected to the outlet from the first filter container can advantageously be positioned such that only the first filter container and the upstream pump are set under vacuum. As a result, the resulting vacuum in the volume is advantageously greatly reduced since no vacuum is required in the two downstream filter containers. The upstream pump, preferably a recirculation pump, is also filled with emulsion at the same time with the sucking-in of the emulsion from the machine tank/the container so that it no longer has to be additionally ventilated. Through the position of the three-way valve in the direction of the first filter container, the emulsion in the first filter container is circulated. In the process, excess air can advantageously be discharged via the upper gas chamber. In the case of a stable emulsion, the three-way valve can then be switched in the direction of the second container so that the emulsion is guided there for further purification. The switching of the three-way valve can take place either after a certain time or upon reaching a certain measured value, for example by measuring the changes in the vacuum. The first filter container therefore preferably has a vacuum gauge.

In a preferred embodiment, the first filter container has a level control unit that has a perpendicularly extending tube and a flexible container fastened at the lower open end of the tube, wherein a liquid is located in the container and in the tube.

The flexible container can, for example, be a bag that is formed, for example, from a film, in particular a polyethylene film, for example HDPE.

The flexible container is preferably positioned in the bottom region and below a support screen bottom. In comparison to the prior art, this level control makes it possible to measure the emulsion height without the contaminated emulsion having to enter the level control tube; rather, a separate level control liquid is used. The latter can advantageously be colored for better readability. Furthermore, contamination by deposits in the level control tube is thereby prevented. The higher the emulsion level in the first filter container, the more the emulsion compresses the flexible container so that the liquid located therein is pressed into the tube and the liquid level rises in the tube so that the emulsion level can be read off. The flexible container, in particular a bag, can also be referred to as a membrane compensation container.

In a preferred embodiment, the perpendicularly extending tube is open toward the top.

A tube that is open toward the top can advantageously also be used simultaneously for the degassing of the emulsion in the first filter container, in particular in combination with a degassing unit, for example a gas overflow tube.

In a preferred embodiment, the first filter container has in the upper region a gas overflow tube that is connected to a pump, which is connected to the second filter container.

In this advantageous embodiment, the filter system thus has two pumps, on the one hand the first pump upstream of the three-way valve and on the other hand the second pump assigned to the gas excess pressure tube. The first pump is preferably a recirculation pump, in particular a suction-pressure recirculation pump. The second pump is preferably an air pump, in particular a suction-pressure air pump.

Further pumps can advantageously be omitted, for example a third pump as assigned in the prior art as an air pump for supplying gas to the line between the first filter container and the second filter container.

Furthermore, the second pump, in particular an air pump, can advantageously be used to pump air into the second filter container, also called an oxidation container.

In a preferred embodiment, the perpendicularly extending tube is open toward the top and the lower end of the gas overflow tube extends into the perpendicularly extending tube, wherein the gas overflow tube has a smaller diameter than the perpendicularly extending tube so that gas can enter the upper opening of the perpendicularly extending tube.

As a result of this structure, emulsion cannot enter the perpendicular tube of the level control from above as a result of the measurement and control of the emulsion level in the first filter container since the open tube end ends above the emulsion level in the gas chamber. At the same time, however, gas from the gas chamber can enter the tube and can be discharged upward via the gas overflow tube, in particular if the emulsion fill level is so low and the gas chamber is thus filled to such an extent that the level control liquid has dropped to such an extent that a preferred float air vent opens and allows the gas to escape. If the emulsion height increases again, the level control liquid also rises upward through the gas overflow tube and thus once again closes the float air vent. The gas can then be transported via the air pump into the second filter container.

A further advantage of this preferred level control of the emulsion fill level in the first filter container is the possibility of an automatic gas/air control. The preferred air pump can convey not only the excess gases but also fresh air into the second filter container.

In a preferred embodiment, the first filter container has a vacuum gauge.

In a preferred embodiment, the second filter container has a manometer.

In a preferred embodiment, the three-way valve, the first pump, the second pump, the vacuum gauge and the manometer are connected to a computer for controlling the filter system.

Advantageously, the filter system can be controlled in an automated manner via a computer or by a computer if the computer measures the values of the vacuum gauge and of the manometer and controls the three-way valve, the first pump, preferably a recirculation pump, and the second pump, preferably an air pump, according to the measured values. It has been found that the measurement of the vacuum of the fill level in the first filter container and of the pressure in the second filter container is sufficient for the control, that is, the control of the supply quantity of emulsion and the switching of the three-way valve.

It has been found that the structure of the filter system according to the invention advantageously results in that the level differences of the emulsion level are only smaller and level changes occur more slowly.

In a preferred embodiment, the outlet of the first filter container and/or the outlet of the second filter container is not located on the bottom but on the side wall, in particular in the lower region of the side wall. In this manner, the formation of a vortex, also referred to as the "donut effect," can advantageously be prevented so that the emulsion remains more uniform.

The invention also relates to a filter system for removing and/or neutralizing undissolved oils and greases on/in water-containing emulsions from, in particular, containers and tanks that are used for holding and storing emulsions that are used for cooling and lubricating workpieces and tools during machining, preferably a filter system described herein, with at least
  a device for sucking the emulsion out of the emulsion tank/container,
  a line from the device to an inlet of a first filter container,
  the first filter container,
  a line from the first filter container to a second filter container,
  the second filter container,
  a third filter container, which is connected to the second filter container via a line,
wherein the first filter container and/or the second filter container and/or the third filter container respectively have a removable screen insert, in which a plurality of spherical filter elements is located.

In a preferred embodiment, the screen insert is formed from a lateral screen grid and a screen bottom.

In a preferred embodiment, the lateral screen grid of the screen insert has a screen mesh width that is at least 10% and at most 30% smaller than the diameter of the spherical filter elements, preferably approximately 20% smaller than the diameter of the spherical filter elements.

The spherical filter elements preferably have a density of $>1$ kg/cm$^3$.

The preferably slightly smaller screen mesh width with respect to the diameter of the spherical filter elements advantageously leads to the filter elements laterally projecting somewhat out of the screen insert. This has the advantage that the filter elements protrude into the intermediate space between the inner wall of the filter container and the screen grid so that this intermediate space cannot result in a channeled outflow past the filter elements. Nevertheless, the screen cylinder can preferably be pulled upward out of the filter container without a great expenditure of force, in order to remove the filter spheres from the filter container for cleaning or replacement, for example.

Thus, due to the corresponding screen mesh width, the filter spheres can lie against the inner wall of the filter container despite the screen insert.

Preferred embodiments of this subject matter of the invention with respect to the overall filter system arise from the present description.

For this purpose, preferred embodiments form the lateral screen grid and the screen bottom forms a screen insert, for example in the shape of a basket. At the same time, the screen bottom is advantageously used as a separation unit, as described in the prior art.

The invention also relates to a filter system for removing and/or neutralizing undissolved oils and greases on/in water-containing emulsions from, in particular, containers and tanks that are used for holding and storing emulsions that are used for cooling and lubricating workpieces and tools during machining, preferably a filter system described herein, with at least
  a device for sucking the emulsion out of the emulsion tank/container,
  a line from the device to an inlet of a first filter container,
  the first filter container,
  a line from the first filter container to a second filter container,
  the second filter container,
  a third filter container, which is connected to the second filter container via a line,
wherein the first filter container has a level control unit having a perpendicularly extending tube and a flexible container fastened to the lower open end of the tube, wherein a liquid is located in the container and in the tube.

Preferred embodiments of this subject matter of the invention with respect to the filter system arise from the present description.

In a preferred embodiment, floating filter elements having a density of less than 1 kg/dm$^3$ are provided in the first filter container.

However, filter spheres that have a greater density and thus do not float in the emulsion can also be provided.

In a preferred embodiment, the filter elements are formed from a diffusion-capable plastic, in particular polyamide.

In a preferred embodiment, the filter elements consist of polyamide or contain predominantly polyamide.

In a preferred embodiment, the filter elements are made of filter plates, in particular with a capillary effect.

The invention thus relates in particular to a filter system for removing and/or neutralizing undissolved oils, greases and salts on/in water-containing emulsions from, in particular, containers and tanks that are used for holding and storing emulsions that are used for cooling and lubricating workpieces and tools during machining, with at least a device as a tangential inlet into an emulsifier filter, an adhesion filter with an automatic air vent, and an oil collection vessel with an outlet, wherein the filter system as a unit treats the emulsion, the insoluble oil-grease droplets, mechanically, physically and biologically so that the oil-grease layer is then separated from the filter system. The filter system preferably has a capillary filter. The latter is preferably connected downstream of the adhesion filter.

With the filter system according to the invention, an injector can advantageously be omitted. Thus, in a preferred embodiment, the filter system does not have an injector.

Preferably, the filter system for sucking the emulsion and the oil-grease film out of the emulsion tank/container has a skimmer, wherein a skimmer suction connection is preferably provided from above or from below, optionally using a submersible pump.

This solution according to the invention proposes a filter system unit with which machines, tanks and/or containers with the water-containing emulsion can be purified of the surface oil-grease film so that the non-emulsifiable oils/greases are removed from the tank and or the containers, and the formation of fungal and slime bacteria infestation is thus prevented. The non-emulsifiable oil is held back through the addition of gases/air and through the adhesion and capillary reaction and is then separated from the filter system.

The emulsion loaded with track oil can be sucked from the tank or the container via the skimmer by means of tube connection into the emulsifier filter by means of a negative pressure. The negative pressure is preferably produced in that the suction and pressure pump connected downstream of the emulsifier filter pumps the emulsion out of the latter. Since the emulsion is degassed at the negative pressure, it is ensured by means of gas level control that the excess gas is discharged from the emulsifier filter.

If a plurality of machines is connected to a filter system, the emulsion loaded with track oil can also be pumped from the tank or the container via the skimmer by means of tube connection into a collecting line by means of a submersible pump and can then be sucked into the emulsifier filter.

If a plurality of machines is connected to a filter system, the purified emulsion can flow in a distribution line when leaving the filter system and then via the machine connection line and via automatic level dosing by means of an automatic valve, for example as a float valve, back into the tank or the container. In the process, a transverse flow is produced in the tank or the container so that the purified emulsion moves the emulsion loaded with track oil via the skimmer for sucking out.

The gas level control preferably ensures that the fill level in the emulsifier filter container is always at the same level so that the tube cross-section of the tangential feed preferably impinges centrally on the surface. The emulsion loaded with oil/grease is guided through the tangential inflow into rotation about the container axis so that a uniform surface flow is produced. In the process, the lighter oil/grease components (for example, track oil) can be detached from the emulsion stream so that they float on the surface. Filter elements, which are lighter in density than the density of the emulsion, preferably float in the surface of the emulsion so that they also circulate on the surface as a result of the rotational flow. As a result of the rotating flow, the filter elements collide and thereby break up the oil-grease film into small microdrops, which are then carried along as a result of the adhesive force of the emulsion.

The design of the filter elements as round bodies is here advantageous since, in the case of corners and edges (cubes, cuboids, prisms or hollow cylinders), abrasion and the tilting of the filter elements inevitably arise. However, since a closed sphere does not have the desired mixing effect and disintegration effect, it is produced in its design by means of plates. The sphere is advantageously produced as a one-piece injection-molded part and consists of spaced-apart plate-shaped elements, which are composed as two half shells and form the cross points in an arrangement offset at the equator by 90° and flow together there during injection molding and are thereby molded together to form a one-piece element. Between the individual plates, there are intermediate spaces, which form large inflow surfaces along the walls delimiting the intermediate spaces, so that turbulences occur at the edges of the lamellae, which then lead to the desired disintegration effect of the oil-grease film.

The emulsion preferably flows vertically downward into the emulsifier filter container bottom. In the process, the emulsion flows around the filter elements, which are preferably made of a diffusion-capable plastic, preferably of polyamide. Due to the porosity property of the material, this produces up to a 10% loading of the filters. In the process, liquids, salts and gases diffuse into the filter material and thus ensure constant osmotic exchange between the emulsion and the filter sphere. As a result, anaerobic bacteria preferably settle on the surface of the filter sphere and are then constantly supplied with energy by the osmotic exchange and can thus better break down the excess salts. The osmotic pressure thus produced can even flow through a bacterial lawn since high pressure differences can occur in the process. This ensures that, due to this constant osmotic pressure compensation, the intermediate spaces of the filter sphere plates are not blocked.

The emulsion that is thus enriched and prefiltered is preferably pumped into the adhesion filter container through a suction-pressure pump. The adhesion filter and the adhesion filter container are also called oxidation filter and oxidation filter container. In the process, the emulsion is loaded with gas (for example, air) so that a foam-like emulsion is then produced in the head space and in the gas emulsion distributor chamber. By means of a trickle element, the foam-like emulsion is then preferably distributed onto the filter sphere fill arranged thereunder, so that the emulsion is enriched with gas (oxygen) during the vertical outflow of the emulsion. In the process, the different adhesion characteristics of the emulsion and the oils/greases separate the phases so that gas bubbles form from the oils/greases, which gas bubbles then converge onto the polyamide spheres and drop through the screen bottom and then onto the level surface due to the force of gravity. As a result of the differing density between the emulsion (approximately 0.98 kg/dm$^3$) and the oils/greases (approximately 0.85 kg/dm$^3$), the lighter oil/grease gas bubbles float as foam below the screen bottom on the level surface of the emulsion.

The excess gas and the oil/grease foam parts are preferably separated from the emulsion below the screen bottom so that the enriched emulsion leaves the container at the bottom of the adhesion filter. The excess used gas preferably flows with the oil/grease foam by means of an exhaust-air connection into the automatic float drain. When the gases flow out of the adhesion filter into the float drain, the oil/grease foam collecting on the level surface is separated by the bursting of the bubbles so that the excess gases are discharged from the automatic float drain. An oil slick is thereby formed, which then flows into the oil collection vessel via the oil separation connection line. As a result of the differing density between the emulsion and the oil, an under-overflow is produced so that when the lighter oils/greases flow in, the heavier emulsion flows out of the oil collection vessel back into the automatic float drain and then exits the latter via level compensation. The gas-enriched oil/grease separates in the head space of the oil collection vessel so that the excess gas is discharged via the ventilation system. The oil/grease layer, which accumulates downward, is preferably distinguished from the emulsion by means of suitable measurement technology (for example, a detector with an electromagnetic alternating field for distinguishing the dielectric properties) so that manual or automatic discharge of the oils/greases is made possible.

The gas-enriched emulsion preferably leaves the container laterally in the bottom region of the adhesion filter and then flows without gas bubbles from the side into the lower region into the capillary filter. The same diffusion-capable filter elements as already described in the first two filters are used in the capillary filter container. Here, the enriched emulsion flows against the force of gravity via the filter elements so that, in the process, the remaining oils/greases are retained in capillaries between the cavities of the filter plates. The purified emulsion then flows in the head space of the capillary filter container out of the latter so that it is fed back into the tank or into the container by means of a tube connection or hose connection. In the process, a transverse flow is produced in the container so that the emulsion is used once again for cooling and lubricating the workpiece and tool. The capillary filter and the capillary filter container are also called reaction filter and reaction filter container.

In a preferred embodiment, the entry as tangential inlet into the emulsifier filter and the exit from the capillary filter can then be additionally interposed as a return flow into an existing pipeline of a central filter system, for example.

In a preferred embodiment, a skimmer suction connection is provided from above, optionally using a submersible pump, for sucking the emulsion and the oil-grease film out of the emulsion tank/container by means of a skimmer.

In a preferred embodiment, a skimmer suction connection is provided from below for sucking the emulsion and the oil-grease film out of the emulsion tank/container by means of a skimmer.

In a preferred embodiment, the skimmer is designed such that both the emulsion and the oil-grease film can enter the skimmer from the emulsion surface and can be sucked out of the emulsion tank/container.

In a preferred embodiment, the floating oil/grease film is sucked in over the upper edge of the floating body and is sucked out via the gap between the cylinder and the floating body with a suction capacity of 1 to 100%, preferably 10 to 90% of the skimmer inlet, so that the proportion of oil-grease film is less than 1/1, preferably less than 1/20, of the liquid quantity that is sucked out.

In a preferred embodiment, the effective skimmer suction height is dependent on the delivery capacity of the emulsion and the density of the oil-grease film and the downward flow in the skimmer, wherein the downward flow is >0.1 cm/sec but <20 cm/sec, preferably 1 cm/sec, and with an effective skimmer suction height, >1 cm but <100 cm, preferably 10 cm.

In a preferred embodiment, the emulsion loaded with oil-grease film is sucked via a tube-hose connection into the emulsifier filter by means of a suction-pressure pump at negative pressure.

In a preferred embodiment, through the negative pressure in the emulsifier filter and in the emulsion, the excess gases are discharged from the emulsifier filter via the gas chamber and via the mechanical level control and then via the automatic level control.

In a preferred embodiment, the filter elements floating on the surface of the emulsion chamber in the emulsifier filter, preferably spherical filter elements, are set by the tangential inlet into rotational flow around the mechanical level control, wherein, in the process, the filter elements are moved and the oil-grease film that is formed leads to the filter element collision in the rotational flow so that small oil-grease drops are formed and are then carried along with the emulsion in the downward flow.

In a preferred embodiment, the filter elements are preferably made of a diffusion-capable plastic (polyamide) and thereby diffuse up to 10% of liquids, salts and gases into the filter element and thus ensure constant osmotic exchange between the emulsion and the filter element so that anaerobic bacteria preferably settle on the surface of the filter element, which bacteria are then constantly supplied with energy by the osmotic exchange and, in the process, break down part of the excess salts.

In a preferred embodiment, the filter element is preferably formed with adhesion effect in the form of a sphere and from filter plates with a capillary effect, wherein the material is preferably polyamide since the intermediate spaces do not become blocked due to constant osmotic pressure compensation.

In a preferred embodiment, the emulsion flows through the screen bottom out of the emulsifier filter and is loaded by the suction-pressure pump via the injector with a gas/air supply and is then pumped into the adhesion filter, wherein a foam-like emulsion is produced in the gas emulsion distributor chamber, which foam emulsion is distributed by means of a trickle element onto the filter elements arranged thereunder and is thus enriched with gas.

In a preferred embodiment, the excess gases and the oil/grease foam separate from the emulsion below the screen bottom so that the enriched emulsion leaves the container at the bottom of the adhesion filter.

In a preferred embodiment, the excess gases flow with the oil-grease foam into the automatic air vent via the oil-grease/exhaust-air connection, wherein, in the process, the gases collect with the oil-grease foam on the level surface and the bubbles then burst so that the excess gases are discharged from the automatic air vent.

In a preferred embodiment, the oil-grease layer flows via the oil separation connection line into the oil collection vessel, wherein the differing density between the emulsion and the oil/grease layer produces an under-overflow so that, upon the flowing-in of the lighter oil/grease layer, the heavier emulsion flows out of the oil collection vessel back into the automatic air vent and then exits the latter via the level compensation.

In a preferred embodiment, the oil/grease layer enriched with gases separates in the head space of the oil collection vessel so that the excess gas is discharged via the ventilation system.

In a preferred embodiment, the oil-grease layer, which accumulates downward, is distinguished by means of a detector from the emulsion, and a manual or automatic discharge of the oil-grease layer can be initiated.

In a preferred embodiment, the gas-enriched emulsion leaves the adhesion filter at the bottom.

In a preferred embodiment, the gas-enriched emulsion leaves the adhesion filter laterally in the bottom region and flows without gas bubbles from below into the capillary filter against the force of gravity via the filter elements so that, in the process, the remaining oils/greases can be retained in capillaries between the cavities of the filter plates. The purified emulsion then flows in the head space of the capillary filter out of the filter system into the return flow.

In a preferred embodiment, the purification effect of the emulsion from the oil-grease film in the filter system is monitored and controlled by means of oxygen and conductivity measurement so that the conductivity probe (LS) and the oxygen probe (SS) can be used as control variables of the filter system and for the quality assessment of the emulsion.

The invention therefore also relates in particular to a filter system for removing and/or neutralizing undissolved oils, greases and salts on/in water-containing emulsions from, in particular, containers and tanks that are used for holding and storing emulsions that are used for cooling and lubricating workpieces and tools during machining, with a) at least a device as a tangential inlet into a b) emulsifier filter, c) an air pump for gas enrichment, d) an adhesion filter with an automatic air vent, e) an oil collection vessel with an outlet and f) a capillary filter, wherein the filter system as a unit treats the emulsion and the insoluble oil-grease droplets mechanically, physically and biologically so that the oil/grease layer is then separated from the filter system.

A filter system according to the invention is preferred, wherein the filter system has a skimmer for sucking the emulsion and the oil-grease film out of the emulsion tank/container, wherein a skimmer suction connection is preferably provided from above or from below, optionally using a submersible pump.

A filter system according to the invention is preferred, wherein the skimmer is designed such that both the emulsion and the oil-grease film can enter the skimmer from the emulsion surface and can be sucked out of the emulsion tank/container.

A filter system according to the invention is preferred, wherein, due to the negative pressure in the emulsifier filter and in the emulsion, the excess gases are discharged from the emulsifier filter via the gas chamber and via the mechanical level control and then via the automatic level control.

A filter system according to the invention is preferred, wherein floating filter elements with a density of less than 1 $kg/dm^3$ are provided in the emulsifier filter.

A filter system according to the invention is preferred, wherein the filter elements of the emulsifier filter, of the adhesion filter and/or of the capillary filter are formed from a diffusion-capable plastic. A filter system according to the invention is preferred, wherein the filter elements of the emulsifier filter are formed from a diffusion-capable plastic.

A filter system according to the invention is preferred, wherein up to 10% of liquids, salts and gases diffuse into a filter element and thus ensure constant osmotic exchange between the emulsion and the filter element so that anaerobic bacteria preferably settle on the surface of the filter element, which bacteria are then constantly supplied with energy by the osmotic exchange and, in the process, break down part of the excess salts.

A filter system according to the invention is preferred, wherein the filter elements consist of polyamide or contain predominantly polyamide.

A filter system according to the invention is preferred, wherein the filter elements are spherical.

A filter system according to the invention is preferred, wherein the filter elements are made of filter plates with a capillary effect.

The invention also relates to a filter system for removing and/or neutralizing undissolved oils, greases and salts on/in water-containing emulsions from, in particular, containers and tanks that are used for holding and storing emulsions that are used for cooling and lubricating workpieces and tools during machining, wherein the filter system has filter elements, wherein the filter elements consist at least predominantly of juxtaposed plastic plates combined to form a body, wherein the base material used for the plastic plates is a plastic with a water absorption capacity of greater than 1%.

A filter system according to the invention is preferred, wherein the base material for the plastic plates is polyamide.

A filter system according to the invention is preferred, wherein the filter element is spherical.

A filter system according to the invention is preferred, wherein the filter system is used alternatively or also for removing suspended particles, in particular metal debris. It has been found that the filter system according to the invention surprisingly also leads to a reduction of metal debris in the emulsion.

The invention also relates to a method for removing and/or neutralizing undissolved oils, greases and salts on/in water-containing emulsions from, in particular, containers and tanks that are used for holding and storing emulsions that are used for cooling and lubricating workpieces and tools during machining, wherein a filter system according to the invention is used in the method.

Surprisingly, it has been found that the filter elements described in DE 10 2009 043 110 A1 are suitable not only for cleaning pond systems and aquariums but also for removing and/or neutralizing undissolved oils, greases and salts on/in water-containing emulsions from, in particular, containers and tanks that are used for holding and storing emulsions that are used for cooling and lubricating workpieces and tools during machining. These filter elements can therefore also preferably be used in the filter system according to the invention, both in the emulsifier filter and in the adhesion filter and in the capillary filter. The description of DE 10 2009 043 110 A1 is thus part of the present application.

In the process, a filter element consisting of juxtaposed plastic plates combined to form a body is preferred, wherein the base material used for the plastic plates is a plastic with a water absorption capacity of greater than 1%. The base material is preferably polyamide. The polyamide is preferably PA 6, in particular PA 6 E.

The base material is preferably a polyamide having a density of greater than 1 $kg/dm^3$. Alternatively, the base material is a polyamide having a density of less than 1 $kg/dm^3$. As a result of the density, it is advantageously possible to influence whether the filter elements float on the emulsion or sink in the emulsion.

Preferably, the filter element is designed as a one-piece, ball-like, i.e., spherical, injection-molded part.

Preferably, the filter element is formed from at least two injection-molded parts that can be detachably connected to one another.

In one embodiment, additives, such as glass spheres, air, gas or fibers, are added to the base material prior to injection.

The filter system is preferably connected to the container or the tank via an inlet and an outlet.

The invention also relates to a method for removing metal debris from water-containing emulsions from, in particular, containers and tanks that are used for holding and storing emulsions that are used for cooling and lubricating workpieces and tools during machining, wherein an oil-grease film and parts of the emulsion are filtered by a filter system according to the invention.

Additional preferred embodiments arise from the dependent claims.

In the following, the invention is further explained and described with reference to the exemplary embodiments illustrated in the drawings and an exemplary application, without these examples being understood as limiting.

Figure 1:
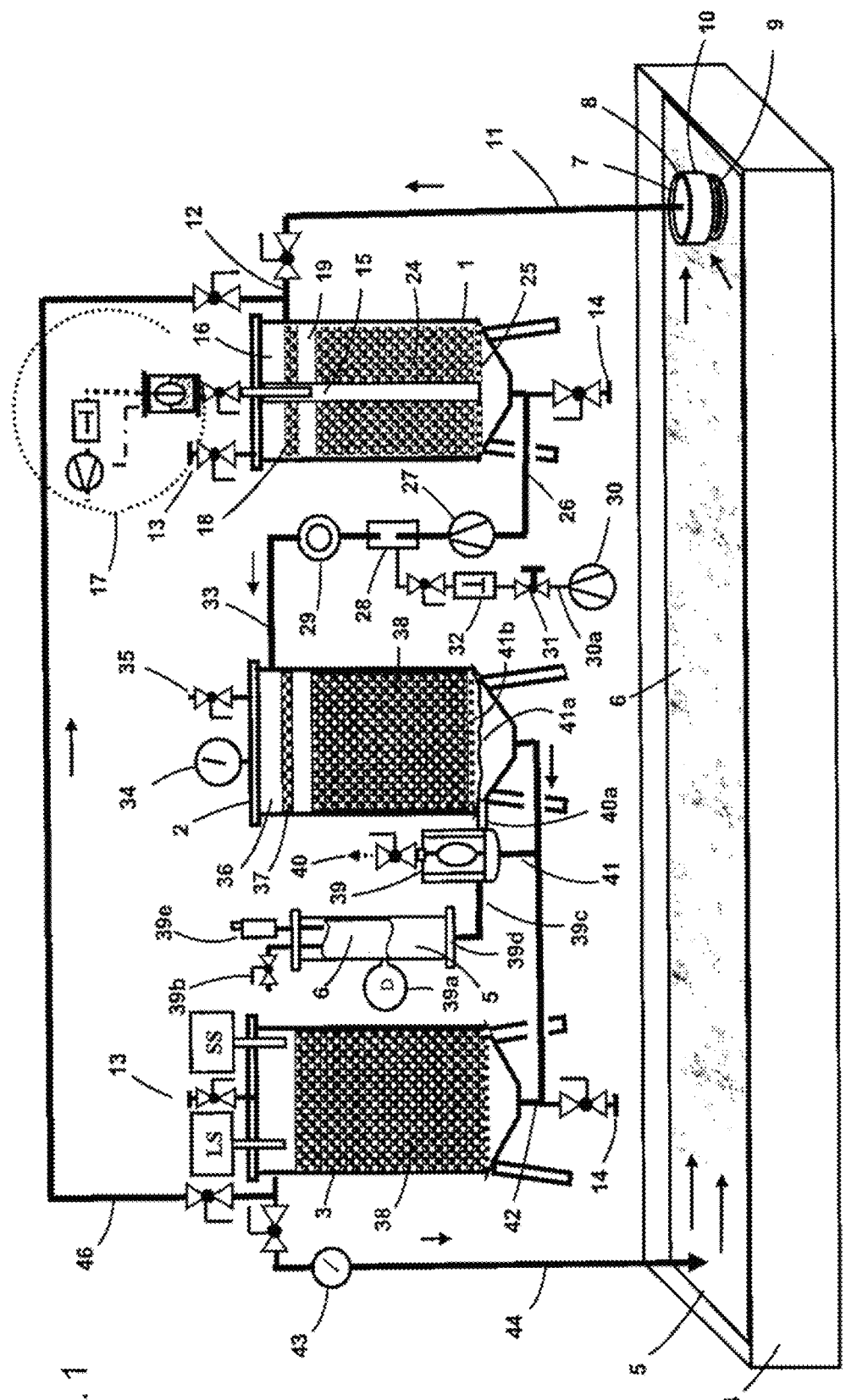
FIG. 1 shows a schematic representation of a filter system from the prior art.

One embodiment of a filter system from the prior art is schematically shown as a whole in FIG. 1.

Such a filter system is described in WO 2014/198867 A2, the content of which is incorporated into the present application and the disclosure of which is referenced in its entirety.

The basic principle of the mode of operation is explained on the basis of the filter system of FIG. 1. The improvements according to the invention are then shown with respect to FIG. 5.

The system as a whole is preferably associated with a metal cutting system and its storage tank and/or container in which the emulsion is held available. The supply line and discharge line to the emulsion tank and/or container to the emulsion to be purified are associated therewith.

The essential components of the filter system are, on the one hand, the sucking-out of the emulsion 5 in interaction with the proportionate oil-grease film 6 by means of a skimmer 7 as a skimmer suction connection from above or, in the case of a plurality of machines, with support of a submersible pump in the skimmer and downstream collecting line or as a skimmer suction connection from below as a function of the type and embodiment of the emulsion tank/container 4, of the emulsifier filter 1, of the adhesion filter 2 and of the capillary filter 3. The mode of operation and the structure of the individual components are described below.

The water-containing emulsion 5 to be purified, which is used for cooling and lubricating workpieces and tools during the machining of workpieces, is introduced by means of the skimmer 7 and via the skimmer outlet 11 and then by means of a tube line or hose line and then as a tangential inlet 12 into the emulsifier filter 1 for purification.

The skimmer 7 simultaneously sucks the emulsion 5 and the oil-grease film 6 from the emulsion surface into the emulsion tank/container 4. The floating oil/grease film 6 is sucked in over the edge of the floating body 10. The floating body 10 is carried by gases 30a as a gas cushion on the emulsion surface; in the process, it is held in position by a stationary cylinder that protrudes into the floating body 10. Between the cylinder and the floating body is a floating body, the width of which is sucked out from below the emulsion surface as a skimmer inlet below 9 or above 8 at a suction capacity of 1 to 100%, preferably 90% of the emulsion feed. This effect ensures that the proportion of emulsion/oil-grease film 6 is <1/1, preferably <1/20, of the amount of liquid sucked out.

The effective skimmer suction height is dependent on the delivery capacity of the emulsion 5 and the density of the oil-grease film 6, and the downward flow in the skimmer 7. The latter moves at a downward flow of >0.1 cm/sec, but 20 cm/sec, preferably 1 cm/sec with an effective skimmer suction height of >1 cm and <100 cm, preferably 10 cm.

The emulsion 5 loaded with oil-grease film 6 is sucked from the emulsion tank/container 4 via the skimmer 7 by means of a tube-hose connection into the emulsifier filter 1 by means of a negative pressure. In the process, during pumping-off by means of suction-pressure pump 27, a negative pressure arises in the emulsifier filter 1 and in the emulsion 5. This negative pressure is simultaneously used for the degassing of the emulsion 5 in order to then discharge the excess gas from the emulsifier filter 1 by means of automatic level control 17.

The mechanical level control 15 is a tube cylinder located in the axis center, which, starting below the container lid, leads vertically downward into the emulsifier filter 1 so that the rotational flow 20 takes place around the latter, and no flow stall occurs in the axis center and an oil-grease film 6 builds up there.

In order to ensure the surface level of the filter elements <1 kg/dm$^3$ 18 floating in the rotational flow 20, the excess gases in the gas chamber of the emulsifier filter 1 are discharged below the lid from above into the centrally arranged tube cylinder, which is held at gas-permeable distance on the lid. A second smaller tube cylinder, which is fastened and sealed in the lid, protrudes up to the level surface of the emulsion so that the excess gases 30a flow into the smaller tube cylinder from below as the gas chamber 16 expands until the level rise causes the tube to be sealed by the emulsion 5.

If the excess gases 30a are discharged from the emulsifier filter 1 and out of the gas chamber 16, an emulsion 5 free of oil-grease film 6 flows from below out of the filter elements >1 kg/dm$^3$ 24 into the tube cylinder, the latter is then detected in the automatic level control and used for the switching thereof.

Figure 2:
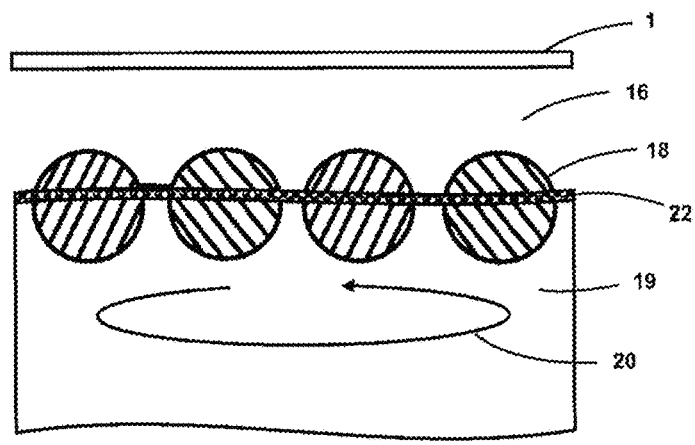
FIG. 2 shows a schematic representation of the rotational circulation according to the invention of the filter spheres in the emulsifier filter.
Figure 3:
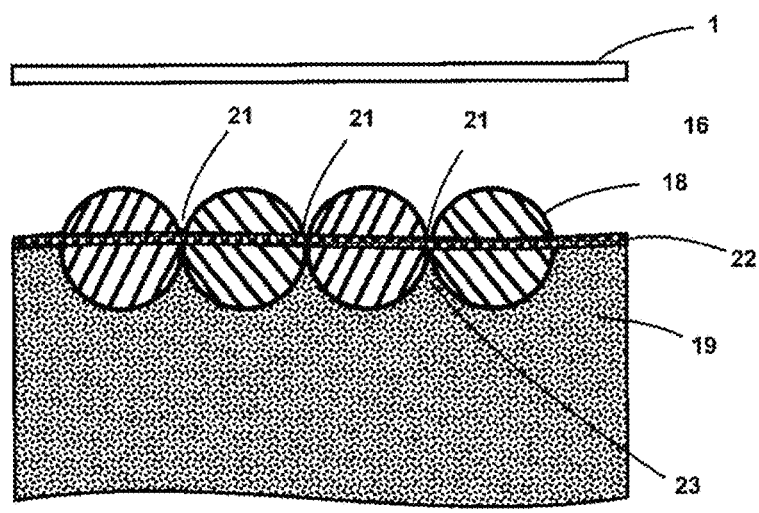
FIG. 3 shows a schematic representation of the collision according to the invention of the filter spheres in rotational circulation, which serves to treat oils/greases in the emulsifier filter.

On the surface of the emulsion chamber 19 in the emulsifier filter 1, filter elements <1 kg/dm$^3$ 18, preferably in spherical form, float, which are set by the tangential inlet 12 into rotational flow 20 around the mechanical level control 15. The filter elements <1 kg/dm$^3$ 18 also move the oil-grease film 6 that forms, as in FIG. 2. In the rotational flow 20, this leads to filter element collision 21, which leads to the result that small oil-grease droplets form as shown in FIG. 3, which are then carried along in the downward flow with the emulsion 5.

In the process, the emulsion 5 flows around the filter elements >1 kg/dm$^3$ 24 made of a preferred diffusion-capable plastic (polyamide). In the process, up to 10% of liquids, salts and gases 30a diffuse into the filter element 38 and thus ensure constant osmotic exchange between the emulsion and the filter element 38. Anaerobic bacteria preferably settle on the surface of the filter element 38 and are constantly supplied with energy by the osmotic exchange and in the process break down part of the excess salts.

The filter element 38 is preferably designed in the shape of a sphere since the flow around a sphere fill is guaranteed for an optimal resistance distribution. The osmotic pressure produced by the preferred material (polyamide) can even flow through a bacterial lawn, as high pressure differences can occur in the process. This ensures that, due to this constant osmotic pressure compensation, the intermediate spaces of the filter sphere plates are not blocked.

The emulsifier filter 1 furthermore has a flush valve 13 and a rinsing liquid inlet 14.

The emulsion flows through the screen bottom 25 out of the emulsifier filter 1 and is pumped through the suction-pressure pump 27 from the outlet 26 via the inlet 33 into the adhesion filter 2 with a pressure monitor 34 and an air vent 35. The line has an inspection glass 29. Previously, the emulsion 5 in the injector 28 is supplied with the gas/air supply 30. In the process, a foam-like emulsion 5 is formed in the gas emulsion distributor chamber 36. By means of the trickle element 37, the foam-like emulsion 5 is then distributed onto the filter elements 38, preferably in spherical form, arranged thereunder and the emulsion 5 is thus enriched with gases 30a, oxygen. In the process, the different adhesion effect 38a of the emulsion 5 and the oils/greases separates the phases so that the gas bubbles form from the oils/greases, which gas bubbles then converge onto the polyamide spheres and drop through the screen bottom 25 and then onto the level surface 41a due to the force of gravity. Due to the differing density between the emulsion 5 (approximately 0.98 kg/dm$^3$) and the oils/greases (approximately 0.85 kg/dm$^3$), the lighter oil/grease gas bubbles float as oil-grease foam below the screen bottom 25 on the level surface 41a of the emulsion 5.

The excess gas 30a and the oil/grease foam separate from the emulsion 5 below the screen bottom 25 so that the enriched emulsion 5 leaves the container at the bottom of the adhesion filter 2. The excess used gas 30a flows with the oil-grease foam by means of oil-grease/exhaust-air connection 40a into the automatic air vent 39. When the gases 30a flow from the adhesion filter 2 into the automatic air vent 39, the oil-grease foam accumulating on the level surface is separated by the bursting of the bubbles so that the excess gases 30a are discharged from the automatic air vent 39 as exhaust air 40. In the process, an oil-grease layer is formed, which then flows via the oil separation connection line 39c into the oil collection vessel 39d with the air vent 39b. As a result of the differing density between the emulsion 5 and the oil/grease, an under-overflow is produced so that when the lighter oils/greases flow in, the heavier emulsion 5 flows out of the oil collection vessel 39d back into the automatic air vent 39 and then exits the latter via the level compensation 41. The oil/grease enriched with gases 30a separates in the head space of the oil collection vessel 39d so that the excess gas is discharged via the ventilation system 39e. The oil-grease layer, which accumulates downward, is measured by means of suitable measurement technology (for example, a detector 39a with an electromagnetic alternating field for distinguishing the dielectric properties). The oils/greases can thus be distinguished from the emulsion 5 so that manual or automatic discharge of the oils/greases is made possible.

The gas-enriched emulsion 5 leaves the container at the bottom of the adhesion filter 2 and then flows without gas bubbles from below via the inlet 42 into the capillary filter 3. The same diffusion-capable filter elements 38, as already described in the first two filters, are used in the capillary filter 3 container. In the process, the enriched emulsion 5 flows against the force of gravity via the filter elements 38 so that, in the process, the remaining oils/greases can be retained in capillaries between the cavities of the filter plates. The purified emulsion 5 then flows in the head space of the capillary filter 3 out of the latter as a return flow 44 so that it is returned to the emulsion tank/container 4 by means of a tube connection or hose connection with a temperature monitor 43. In the process, a transverse flow is produced in the emulsion tank/container 4 so that the emulsion 5 is once again used for cooling and lubricating the workpiece and tool.

If necessary, the purification of the emulsion 5 can be interrupted by the emulsion tank/container 4. The emulsion stream can then be short-circuited between the exit of the capillary filter 3 and the inlet of the emulsifier filter 1 in the bypass 46. An adjusted gas/air supply 30 of the bacteria can thus be ensured by the flow regulator 31 with a backflow preventer 32 and via the injector 28.

The emulsion 5 flows against the force of gravity from the container bottom upward in the head space of the capillary filter 3. In the process, the buffered gases 30a from the emulsion 5 expand since the pressure resistance in the capillary filter 3 is less than in the adhesion filter 2. This gas expansion can be determined by means of oxygen sensor SS since the latter indicates the saturation limit of the liquid, the emulsion 5, in its setting. For example, fresh water can buffer approximately 9.1 mg/l of oxygen at 20° C. normal pressure 1013 mbar, which is then 100% saturation. With the overpressure of approximately 100 mbar (1113 mbar), this is approximately 10 mg/l and consequently 110% saturation. Such pressure is relieved during the upward flow in the capillary filter 3 since the static liquid column decreases upward in the capillary filter 3. As a result of the pressure reduction, the buffered gases 30a expand and thereby produce small gas bubbles, which then absorb, on their surface, residual oils and greases that were not retained in the adhesion filter 2, and then in the automatic air vent 39 and in the oil collection container 39d. A conductivity probe LS, which is also installed in the head space of the capillary filter, measures the salinity of the emulsion 5. The measurement here is in µS/cm. This value is 0 µS/cm in distilled water since no salts are present. In the case of domestic tap water, the value is approximately 400 to 700 µS/cm. In the case of an emulsion, this value can also be far higher since it can also be far more than 1000 µS/cm due to the evaporation of the water from the emulsion and due to the entry of impurities during machining. A conductivity probe functions according to the principle of resistance. In the process, an electrical voltage is applied between two, e.g., stainless-steel, electrodes so that a few millivolts at the plus electrode are measured by means of liquid resistance of the emulsion as a function of the temperature at the second minus electrode. Here, it has been shown that an almost stable value is indicated in liquids without oil-grease film 6. If gas bubbles loaded with oil or grease flow over the electrodes, the contact between the liquid and the electrode is temporarily reduced and thus also the measured and indicated conductivity through the oil-grease adhesions. In the process, measurement value fluctuations of multiple 100 µS/cm, even multiple 1000 µS/cm, can occur. These variations stabilize the lower the oil-grease foam in the emulsion 5 is. This fact can therefore be used as an indicator and as a manipulated and control variable for a purified emulsion 5 and can therefore be used for controlling the pressure resistance, the emulsion flow and for gas enrichment.

Figure 4:
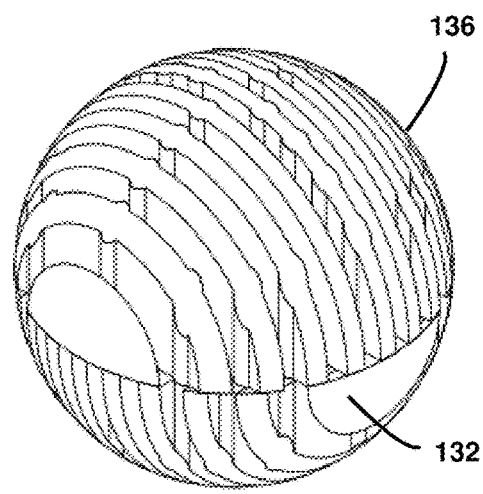
FIG. 4 shows a spatial representation of the filter element according to the invention as filter spheres.

FIG. 4 shows a preferred filter element 132 for a filter system according to the invention. The filter element 132 has a spherical shape 136 and consists of polyamide. Corresponding filter elements are described in more detail in DE 10 2009 043 110 A1 and WO 2014/198867 A2.

Figure 5:
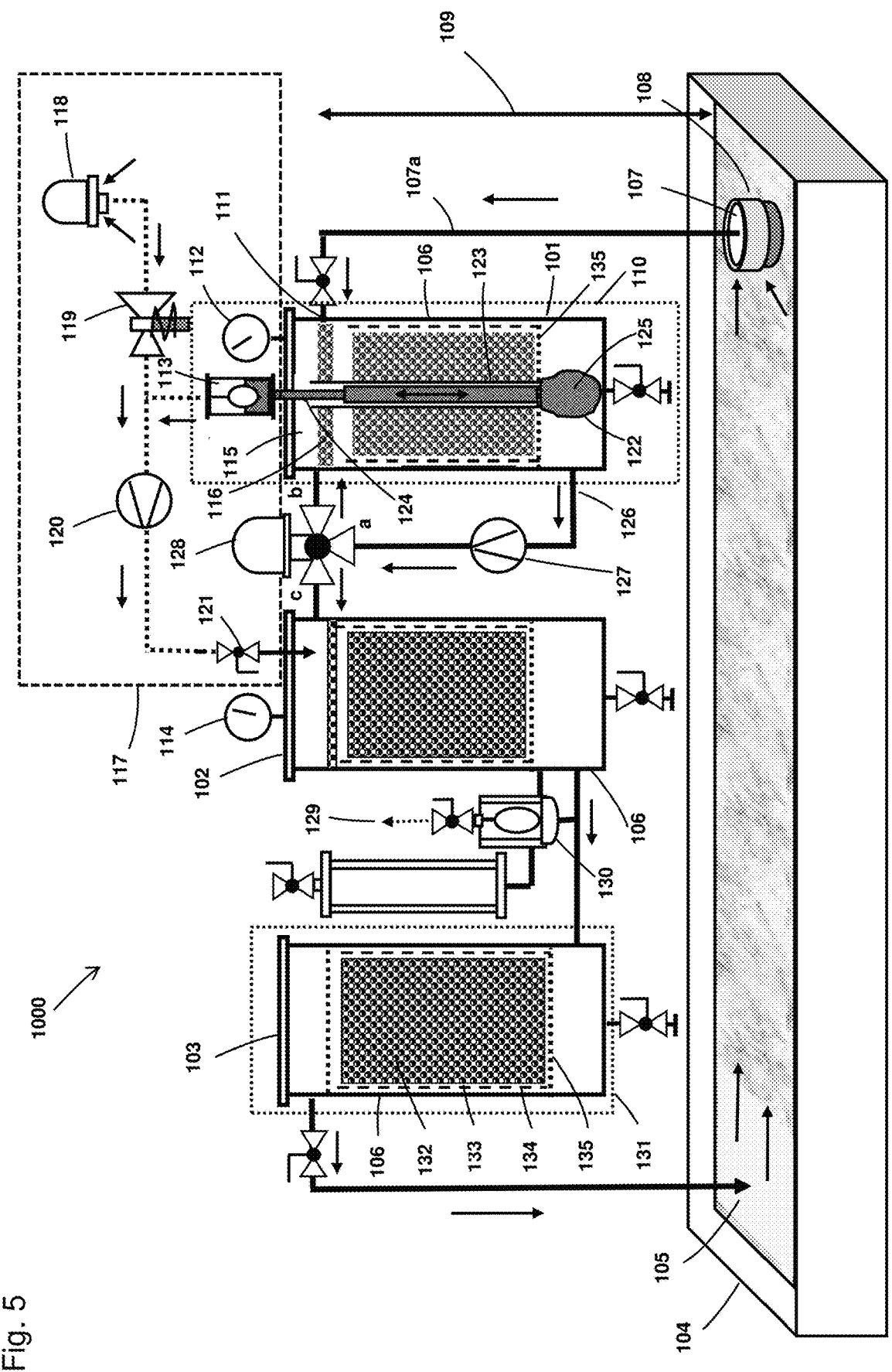
FIG. 5 shows a schematic representation of a filter system according to the invention.

FIG. 5 shows a preferred structure of a filter system 1000 according to the invention.

The structure and mode of operation are based on the filter system according to FIG. 1 but have the following differences relevant to the invention:

The emulsion 105 is guided via the upper skimmer inlet 108 of the skimmer 107 via the line 107a to the tangential inlet 111 of the first filter container 101.

In an advantageous embodiment of the filter system unit 1000, a three-way valve 128 is connected downstream of the suction-pressure recirculation pump 127. The three-way valve inlet 128a can be set as an outlet to the right 128b when the emulsion is sucked in by means of a suction-pressure air pump 120. As a result, only the emulsifier filter container 101 and the suction-pressure recirculation pump 127 are set under vacuum. The air suction and the resulting vacuum are greatly reduced in volume since no vacuum is required in the two downstream filter containers 102, 103.

From this advantageous embodiment of the invention, the suction-pressure recirculation pump 127 is filled with emulsion 105 at the same time as the emulsion is sucked in from the machine tank/container 104, so that said emulsion no longer has to be additionally ventilated.

In a further advantageous embodiment of the mechanical level control 123, the loaded emulsion 105 is no longer sucked into the level chamber; rather, a neutral and clean liquid is sucked into the level chamber. In the process, the liquid is stored in a flexible container 122, which is preferably positioned in the bottom region and below the support screen bottom 135.

In this advantageous embodiment of the mechanical level control 123, the membrane compensation container 122 is welded together from an HDPE film. The film consists of, for example, a piece of a rectangular design. A hole is punched in the diagonal. Here, a fixed transition is inserted into the hole and fixed and sealed by the opposite side of the film by means of a screw sealing element. The film is then welded on three sides. The membrane compensation container 122 is then screwed into the sleeve of the stand tube 123 of the mechanical level control, preferably by means of an external thread, and is thereby sealed.

In an advantageous embodiment of the mechanical level control, the stand tube 123 is vertical in the axis center of the emulsifier filter container 101, and, starting from approximately 3 mm below the container lid, downward against the force of gravity with an ended threaded sleeve, which is welded onto the support screen bottom 135. As a result, the membrane compensation container 122, the screen bottom 135 and the stand tube 123 form one unit as a mechanical level control.

In order to remove the gases from the head space of the emulsifier filter container 101 and to ensure in the process that the level surface is constant, the gases below the lid are discharged into the centrally arranged gas overflow tube 124. The gas overflow tube 124, which is smaller in diameter, is fastened and sealed in the lid. The length of the lid leads to the level surface like that of the emulsion, so that the excess gases flow into the gas overflow tube when the emulsion levels are undershot.

In a further advantageous embodiment of the mechanical level control, the fill level in the level control liquid 125 behaves approximately the same as the fill level of the emulsion around the mechanical level control. Here, the emulsion must generate a static pressure onto the membrane compensation container 122, preferably made of an HDPE film. The fill level in the stand tube 123 of the mechanical level control is somewhat lower since the static pressure of the emulsion must deform the membrane compensation container 122. Depending on the stiffness of the membrane compensation container 122, the fill level of the level control liquid 125 is reduced in the stand tube 123. Depending on the stiffness, the level differences can be approximately 1 to 20 cm. In the case of a membrane compensation container 122 made of a 100 μm HDPE film, this is approximately 2 cm fill-level resistance. In order to compensate for the level, the gas overflow tube 124 must be approximately 2 cm longer than the desired emulsion surface, which is in the region of the tangential inlet 111.

In a further advantageous embodiment, an automatic float air vent 113 is positioned in the extension of the gas overflow tube 124 and at the same time outside of the emulsifier filter container 101 and on the lid. By means of a suction-pressure air pump 120, the air gases are sucked out of the gas chamber 115 so that the level control liquid 125 then flows into the automatic float air vent 113 and lifts the float with valve pin, which closes the gas-air outflow to the suction-pressure air pump 120. Since the pressure conditions in the process and on the membrane compensation container 122 are subject to only very small fluctuations, the continuous excess gas can be continuously discharged. In the process, the level changes in the emulsion amount to only a few mm. Damage to the membrane compensation container 122 due to increased bending behavior can thus be ruled out.

A further advantage of the level control of the emulsion fill level in the emulsifier filter container 101 is the automatic gas/air control 117. As a result, the excess gases from the automatic float air vent 113 and simultaneously fresh air are conveyed via the ventilation valve 121 into the second filter container 102 by means of a suction-pressure air pump 120.

When the filter system 1000 is put into operation, the emulsion 105 is sucked out of the emulsion tank/container 104 into the emulsifier filter container 101. This results in a vacuum and thus a static negative pressure as a function of the suction height/resistance 109. With 1 m of suction height, for example, the suction-pressure air pump 120 must generate a negative pressure of 100 mbar. So that the suction-pressure air pump 120 does not suck in fresh air via the supply-air suction filter 118, a mechanical and spring-loaded regulating valve 119 is interposed as an automatic gas/air control 117. The presetting of the automatic gas/air control 117 and thus the opening of the valve is preset to >100 mbar. In order to ensure an excess of negative pressure, the resistance of the automatic gas/air control 117 is preset to 150 mbar. The suction-pressure air pump 120 then conveys an air-gas mixture via the ventilation valve into the downstream oxidation filter container 102.

So that an automatic operation of the filter system is possible, the changing negative pressure in the emulsifier filter container 101 is measured at the start of operation. By means of vacuum gauge 112, the increasing negative pressure can be measured depending on the fill level of the emulsion 105. By means of computer control, a stagnation of the negative pressure can be carried out for further switching. A negative pressure that is no longer changing, for example 100 mbar, signals the full filling of the emulsifier filter container 101. The suction-pressure recirculation pump 127 is switched on automatically and the emulsion 105 is circulated in the bypass from the three-way valve 128 inlet from below 128a in the outlet from the three-way valve outlet to the right 128b into the emulsifier filter container 101. Excess air can be discharged via the gas chamber 115. With a stable recirculation of the emulsion 105, the three-way valve 128 can be switched from the right position 128b to the three-way valve outlet to the left 128c based on the pressure-vacuum changes or the pump data readout, or only after a chronological sequence.

After the three-way valve 128 has switched to the left, the suction-pressure recirculation pump 127 conveys the emulsion into the head space of the oxidation filter container 102. The air and the emulsion then mix there. The excess air is then discharged via the automatic air vent 130 as exhaust air 129. The emulsion 105 then flows laterally and above the oxidation filter container 102 into the downstream reaction filter container 103 and then exits the latter in the head space to the left.

In a further advantageous embodiment of the invention, the pressure is measured by means of a manometer 114 in the head space of the oxidation filter container 102. By means of computer control, the resistances that can be changed by the process can be detected and evaluated.

Due to an advantageous arrangement of the container outlet nozzle from the emulsifier filter container 101 as a horizontal and lateral container outlet 126, the formation of a vortex is prevented in comparison to a bottom suction. This additionally brings about a uniform recirculation of the emulsion 105 and creates the space for the membrane compensation container 122.

In a further advantageous embodiment of the invention, the filter elements 132 are inserted into a screen cylinder 133. This is also shown in detail in FIG. 8. So that the screen cylinder 133 can be inserted into the respective filter containers 101, 102, 103 as a unit 131, an air chamber is required between the screen cylinder 133 and the container inner wall 106. The air chamber 134 between the screen cylinder and the container inner wall must not become too large since the emulsion 105 could otherwise flow out of the channel. In order to avoid this, the screen mesh width is approximately 20% smaller than the diameter of the spherical filter elements 132.

A filter element 132 can have a diameter of 12 mm, for example. The screen cylinder 133 then preferably has a screen mesh width 133a of 10×10 mm. This allows a sphere view of approximately 2.7 mm. In a container 101, 102, 103, this means an internal diameter of 150 mm. The screen cylinder can have an outer diameter of 145 mm. The air chamber 134 between screen cylinder 133 and container inner wall 106 thus enables resistance-free installation and removal during maintenance.

In a further advantageous embodiment of the screen cylinder 133, the screen bottom 135 is welded to the screen cylinder 133 so that a basket is produced and the filter elements 132 can be removed all at once during maintenance.

Figure 6:
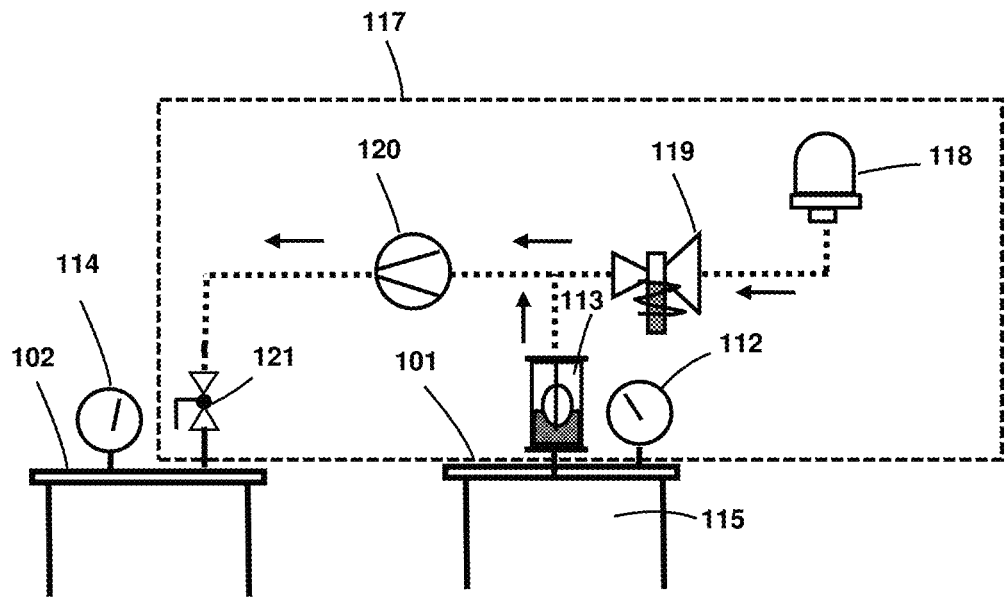
FIG. 6 shows an enlarged section of the automatic gas/air control according to the invention of the filter system of FIG. 5.

FIG. 6 shows the automatic gas air control 117 of FIG. 5 as an enlarged section. The upper sections of the first filter container 101 and of the second filter container 102 can be seen with the gas chamber 115, the vacuum gauge 112, the automatic float air vent 113, the supply-air suction filter 118, the negative pressure regulator 119, the suction compressed-air pump 120, the ventilation valve 121 and the manometer 114.

Figure 7:
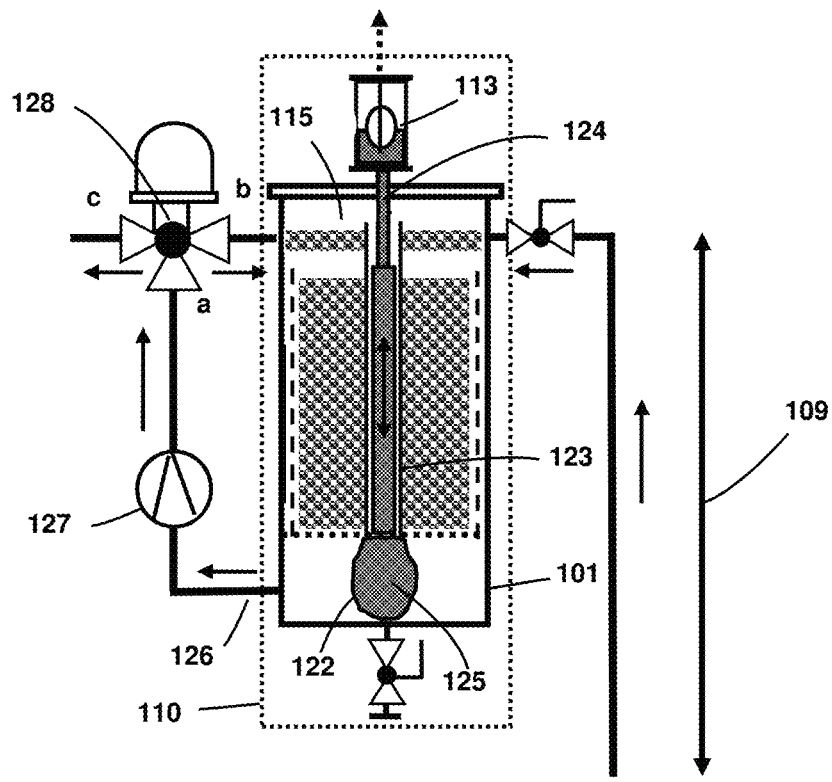
FIG. 7 shows an enlarged section of the level control unit according to the invention of the filter system of FIG. 5.

FIG. 7 shows an enlarged section of the level control unit 110 in the first filter container 101 of FIG. 5. The suction height 109, the compensation container 122 with the stand tube 123, in which the level control liquid 125 is located, and the gas overflow tube 124, through which the gas from the gas chamber 115 can be guided into the automatic float air vent 113, can be seen again. The emulsion is guided from the lateral container outlet 126 via the recirculation pump 127 to the three-way valve 128 with the inlet a and the two outlets b and c.

Figure 8:
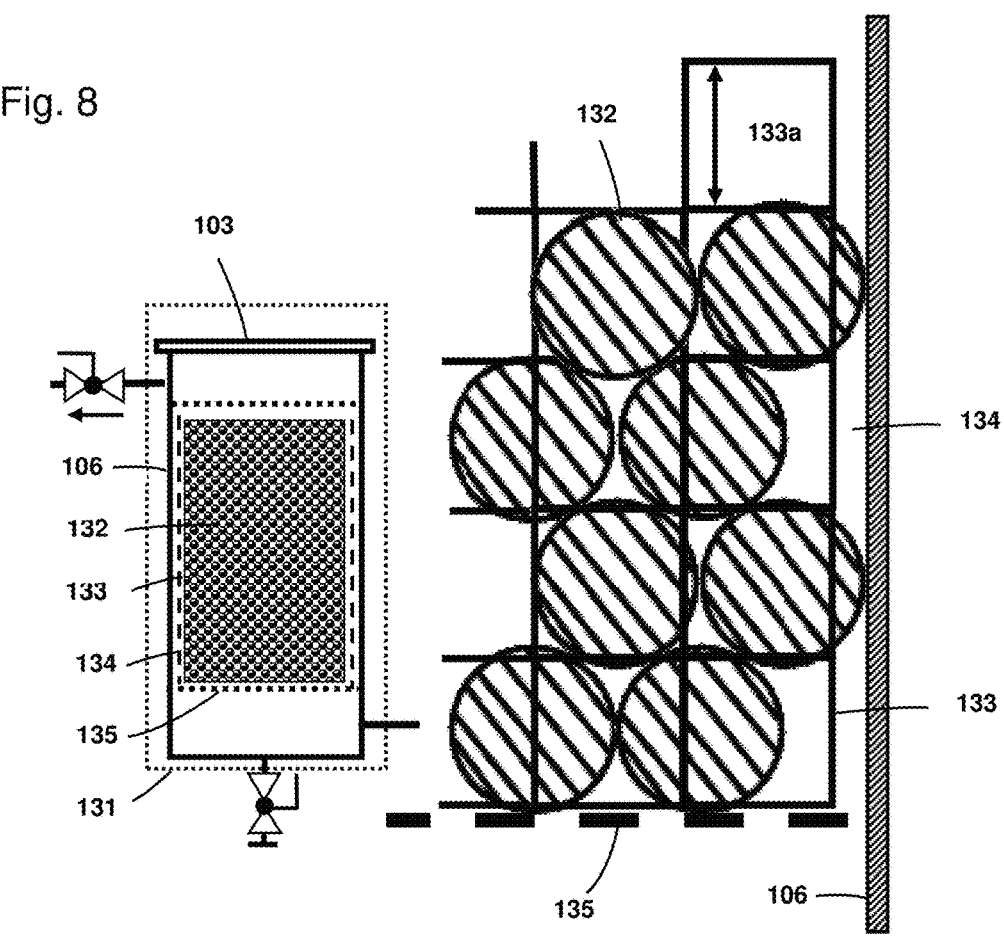
FIG. 8 shows a cross-sectional representation of the preferred structure of a screen insert with filter elements.

FIG. 8 shows an enlarged section of the structure 131 of a screen insert, here in the third filter container 103 with the inner wall 106. The screen insert consists of a screen cylinder 133 and the screen bottom 135. A plurality of spherical filter elements 132 is located in the screen insert. The screen cylinder 133 has a mesh width 133a with a size that allows the filter elements 132 to protrude out of the screen cylinder 133 so that the air chamber 134 between screen cylinder 133 and container inner wall 106 is also filled by filter elements 132.

Figure 9:
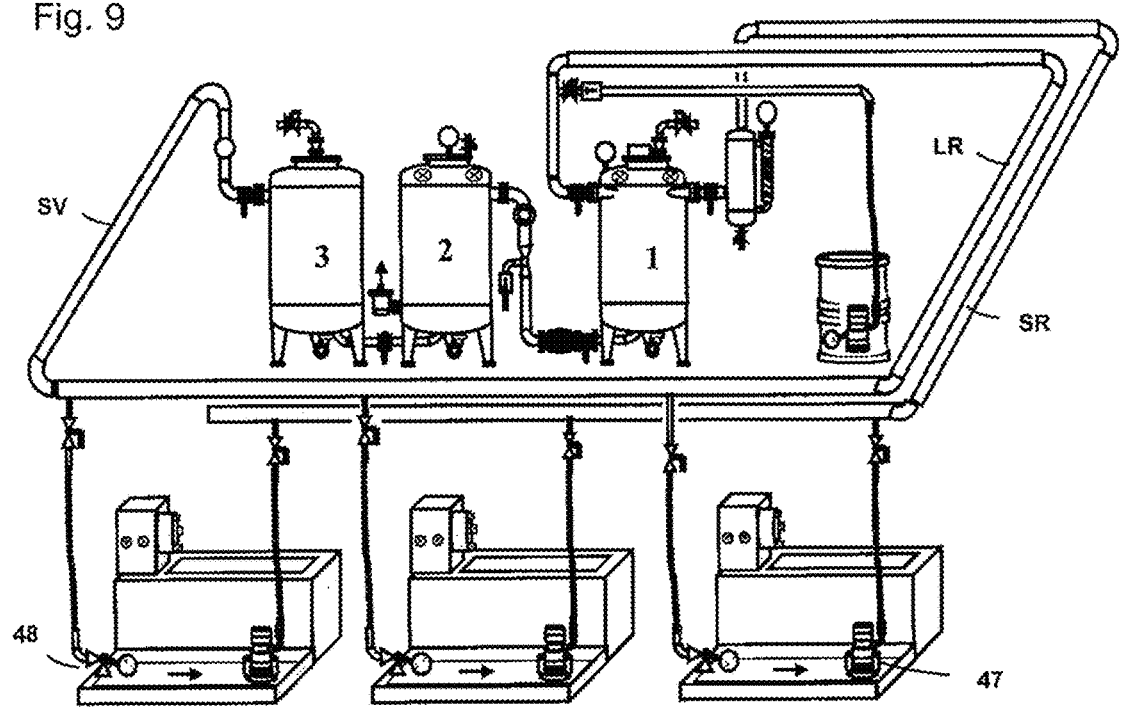
FIG. 9 shows a filter system for treating emulsions from a plurality of machine tools.

As shown in FIG. 9, the filter system can also be used for purifying emulsions from a plurality of machine tools. In the process, the emulsions from the individual emulsion tanks/containers 4 are preferably fed to a collecting feed line SV by means of submersible pumps 47 and reach the emulsifier filter 1 from there. The return flow occurs via a collecting return line SR, from which individual lines LR lead via the float valves 48 into the individual emulsion tanks/containers 4 of the respective machine. According to the invention, this structure is also possible for the filter system according to the invention as shown in FIG. 5.

LIST OF REFERENCE SIGNS

1 Emulsifier filter
2 Adhesion filter
3 Capillary filter
4 Emulsion tank/container
5 Emulsion
6 Oil-grease film
7 Skimmer
8 Skimmer inlet, top
9 Skimmer inlet, bottom
10 Floating body
11 Skimmer outlet
12 Tangential inlet
13 Flush valve
14 Rinsing liquid inlet
15 Mechanical level control
16 Gas chamber
17 Automatic level control
18 Filter elements <1 kg/dm$^3$
19 Emulsion chamber
20 Rotational flow
21 Filter element collision
24 Filter elements >1 kg/dm3
25 Screen bottom
26 Outlet of emulsifier filter
27 Suction-pressure pump
28 Injector
29 Inspection glass
30 Gas/air supply
30a Gases
31 Flow regulator
32 Backflow preventer
33 Inlet of adhesion filter
34 Pressure monitor
35 Air vent
36 Gas emulsion distributor chamber
37 Trickle element
38 Filter elements
39 Automatic air vent
39a Detector (oil/water/emulsion)
39b Outlet (oil/water/emulsion)
39c Oil separation connection line
39d Oil collection vessel
39e Ventilation system
40 Exhaust air
40a Oil-grease foam/exhaust-gas connection
41 Level compensation
41a Level surface (oil/water/emulsion)
41b Oil-grease foam
42 Capillary filter inlet
43 Temperature monitor
44 Return flow
46 Bypass
47 Submersible pump 48 Automatic float valve
101 Emulsifier filter container
102 Oxidation filter container
103 Reaction filter container
104 Emulsion tank/container
105 Emulsion
106 Container inner wall
107 Skimmer
107a Line
108 Skimmer inlet, top
109 Suction height/resistance
110 Level control unit
111 Tangential inlet
112 Vacuum gauge
113 Automatic float air vent
114 Manometer
115 Gas chamber
116 Emulsion chamber
117 Automatic gas/air control
118 Supply-air suction filter
119 Negative pressure regulator
120 Suction-pressure air pump
121 Ventilation valve
122 Membrane compensation container
123 Stand tube of mechanical level control
124 Gas overflow tube
125 Level control liquid
126 Lateral container outlet
127 Suction-pressure recirculation pump
128 Three-way valve
128a Three-way valve inlet from below
128b Three-way valve outlet to the right
128c Three-way valve outlet to the left
129 Air vent
130 Automatic air vent
131 Structure of screen insert in container
132 Filter elements
133 Screen cylinder
133a Screen mesh width
134 Air chamber between screen cylinder and container inner wall
135 Screen bottom
136 Spherical shape
1000 Filter system
LS Conductivity probe (measured value in pS/cm)
SS Oxygen probe (measured in % saturation of the emulsion as a function of the temperature)
SV Collecting feed line
SR Collecting return line

The invention claimed is:

1. A filter system for removing and/or neutralizing undissolved oils and greases on/in water-containing emulsions from an emulsion container, the filter system comprising:
a device for sucking the emulsion out of the emulsion container,
a line from the device to an inlet of a first filter container,
an outlet associated with the first filter container,
a pump connected to the outlet,
a second filter container with a ventilation valve,
a third filter container, which is connected via a line to the second filter container; and
a three-way valve having an inlet, a first three-way outlet, and a second three-way outlet, wherein the inlet of the three-way valve is connected to the pump, the first three-way outlet is connected to the first filter container and the second three-way outlet is connected to the second filter container.

2. The filter system according to claim 1, wherein at least one of the first filter container, the second filter container, and the third filter container comprise a plurality of spherical filter elements.

3. The filter system according to claim 1, wherein the first filter container has a level control unit that has a perpendicularly extending tube and a flexible container fastened at a lower open end of the perpendicularly extending tube, and wherein a liquid is located in the flexible container and in the perpendicularly extending tube.

4. The filter system according to claim 3, wherein the first filter container has in an upper region a gas overflow tube that is connected to a second pump, which wherein the second pump is connected to the second filter container.

5. The filter system according to claim 4, wherein the perpendicularly extending tube is open toward a top and a lower end of a gas overflow tube extends into the perpendicularly extending tube, wherein the gas overflow tube has a smaller diameter than the perpendicularly extending tube so that gas can enter an upper opening of the perpendicularly extending tube.

6. The filter system according to claim 4, wherein the first filter container has a vacuum gauge.

7. The filter system according to claim 6, wherein the second filter container has a manometer.

8. The filter system according to claim 7, wherein the three-way valve, the pump, the second pump, the vacuum gauge and the manometer are connected to a computer for controlling the filter system.

9. The filter system of claim 1, further comprising:
the first filter container, and
a line from the first filter container to the second filter container,
wherein at least one of the first filter container, the second filter container, and the third filter container have a removable screen insert, the removable screen insert having a plurality of spherical filter elements located therein.

10. The filter system according to claim 9, wherein the screen insert is formed from a lateral screen grid and a screen bottom.

11. The filter system according to claim 10, wherein the lateral screen grid of the screen insert has a screen mesh width that is at least 10% and at most 30% smaller than a diameter of the spherical filter elements.

12. The filter system according to claim 9, wherein the first filter container has an upper region, the upper region having a gas overflow tube that is connected to a second pump, the second pump connected to the second filter container.

13. The filter system according to claim 1, wherein the first filter container has an upper region with a gas overflow tube that is connected to a second pump, and the second pump is connected to the second filter container.

14. The filter system according to claim 1, wherein the first filter container has an upper region, the upper region having a gas overflow tube that is connected to a second pump, the second pump connected to the second filter container.

15. The filter system according to claim 1, wherein the emulsion container is used for holding and storing emulsions that are used for cooling and lubricating workpieces and tools during machining.

16. The filter system according to claim 1, wherein the device for sucking the emulsion out of the emulsion container is a skimmer.

17. The filter system according to claim 1, wherein the outlet is arranged laterally from the first filter container.

18. A filter system for removing and/or neutralizing undissolved oils and greases on and/or in water-containing emulsions from containers used for holding and storing emulsions, the filter system comprising:
- a device for sucking the emulsion out of an emulsion container,
- a line from the device to an inlet of a first filter container,
- the first filter container,
- a line from the first filter container to a second filter container,
- the second filter container,
- a third filter container, which is connected via a line to the second filter container,
- wherein the first filter container has a level control unit that has a perpendicularly extending tube and a flexible container fastened at a lower open end of the perpendicularly extending tube, and wherein a liquid is located in the flexible container and in the perpendicularly extending tube.

19. The filter system according to claim 18, the system further comprising a plurality of floating filter elements with a density of less than 1 $kg/dm^3$ the first filter container.

20. The filter system according to claim 19, wherein the plurality of floating filter elements are formed from a diffusion-capable plastic.

21. The filter system according to claim 20, wherein the plurality of floating filter elements consist of polyamide.

22. The filter system according to claim 19, wherein the plurality of floating filter elements are made of filter plates with a capillary effect.

23. The filter system according to claim 18, wherein the first filter container comprises an emulsifier filter container, the second filter container comprises an oxidation filter container, and the third filter container comprises a reaction filter container.

24. The filter system according to claim 18, wherein the emulsions are used for cooling and lubricating workpieces and tools during machining.

\* \* \* \* \*